No. 830,030. PATENTED SEPT. 4, 1906.
H. V. WILLE.
PROCESS FOR THE MANUFACTURE OF COMPOSITE TOOLS.
APPLICATION FILED NOV. 15, 1905.
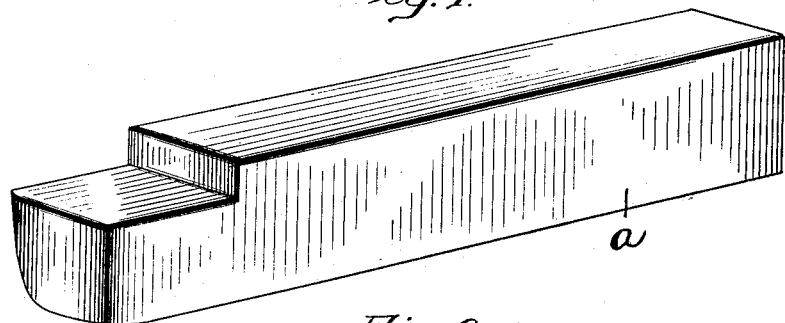
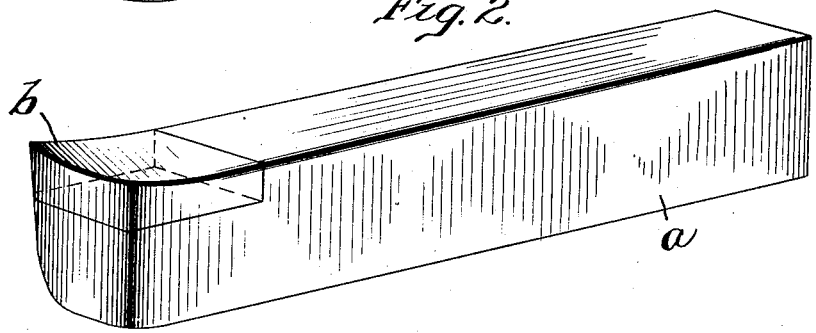
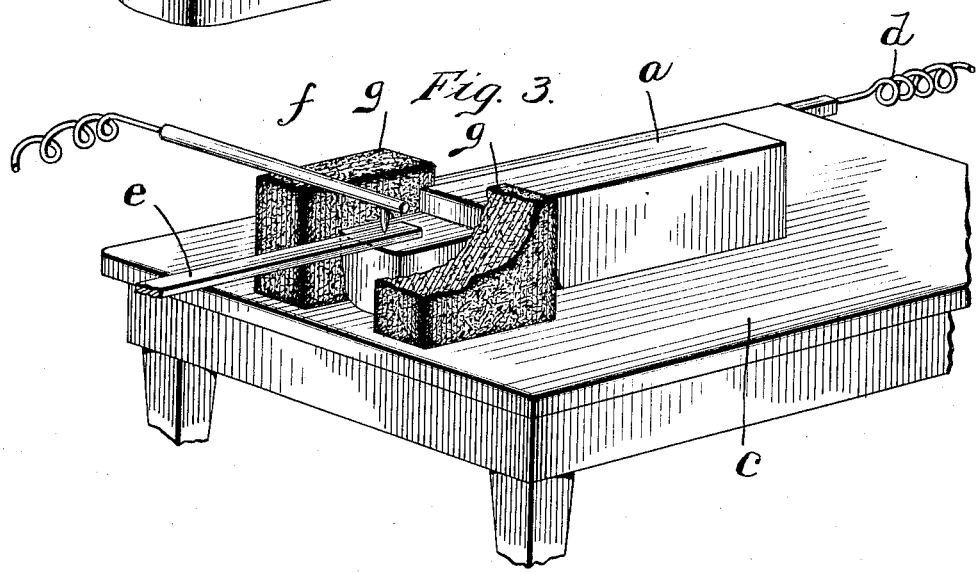
WITNESSES:
F. J. Hartman
F. L. Moister
INVENTOR
Henry V. Wille
BY Chas. A. Cutter
ATTORNEY.

UNITED STATES PATENT OFFICE.

HENRY V. WILLE, OF PHILADELPHIA, PENNSYLVANIA.

PROCESS FOR THE MANUFACTURE OF COMPOSITE TOOLS.

No. 830,030. Specification of Letters Patent. Patented Sept. 4, 1906.

Application filed November 15, 1905. Serial No. 287,410.

*To all whom it may concern:*

Be it known that I, HENRY V. WILLE, a citizen of the United States, and a resident of the city and county of Philadelphia, State of Pennsylvania, have invented certain new and useful Improvements in Processes for the Manufacture of Composite Tools, of which the following is a specification.

My invention relates to improvements in methods for forming composite tools—that is, tools having a stock of a cheap material and a cutting part of a more expensive material—a high-speed alloy steel, for instance; and the object of my invention is to furnish an inexpensive, rapid, and satisfactory method for securing the expensive cutting part of the tool to the cheaper stock.

In carrying out my invention I take a stock of comparatively large cross-sectional area and preferably finish it roughly, and I then connect this stock in any suitable manner with one terminal from a source of electricity, the other terminal of which is formed by or brought in contact with a bar of high-speed alloy steel, the cross-sectional area of which is considerably smaller than that of the stock. The two metals being brought into contact and the current turned on, the first is at the point of contact melted upon its surface only, but the second, owing to its small sectional area, is completely melted and combining with the melted surface of the larger bar is fused thereto.

By proper and continued treatment as much of the latter bar can be fused to the former bar or stock as may be desired.

In the accompanying drawings, Figure 1 is a perspective view of a stock for a lathe-tool; Fig. 2, a perspective view of the stock after the cutting-face of high-speed alloy steel has been fused to it, the tool being completely finished; Fig. 3, a diagrammatic view of an apparatus by means of which the face may be fused to the stock of the tool.

*a* is the tool-stock, in the drawings shown as a stock for a lathe-tool; but it will be understood that I do not confine myself to any particular form of tool; *b*, the cutting-face of the tool, which is of high-speed alloy steel.

My method of securing the cutting-face of the stock is as follows: The stock is placed in electrical connection with one terminal of a suitable electric circuit upon an iron table *c*, Fig. 3, for instance, which is connected by a wire *d* to one terminal of the source of electricity, and a bar *e* of the high-speed alloy steel is brought in contact, or nearly so, with the part of the stock to which it is desired to secure the cutting-face. The other terminal *f* of the electric current is now brought into electrical contact with the bar of high-speed alloy steel, so that the current will pass directly through this bar and that part of the stock to which the cutting-face is to be secured. Instantly the connection is made the arc melts at the point of contact the bar of high-speed alloy steel, which is of comparatively small cross-section, as shown, and owing to its greater area also melts the face only of the stock against which this bar rests. The two metals are thus fused together.

The amount of metal that is melted and fused to the stock can be increased in thickness almost up to any point, and as high-speed alloy steel is benefitted by being subjected to very high temperatures the article produced by this process possesses superior cutting quality.

During the process of fusing the cutting-face of the tool to the stock that part of the stock to which the face is being fused is preferably inclosed by walls of a non-fusible material *g*—graphite, for instance—which not only conserves the heat, but which also acts to retain in place any of the melted metal which might run off if some stop were not provided.

Having thus described my invention, I claim as new and desire to secure by Letters Patent—

The described method for forming a composite tool having a cutting-face of high-speed alloy steel and a stock of a cheaper steel which consists in connecting a stock of comparatively large sectional area to one terminal of an electric circuit and a bar of high-speed steel of comparitively small sectional area to the other terminal of said circuit and fusing said parts by bringing said stock and bar into contact so as to melt the latter completely while the surface only of the former is melted.

HENRY V. WILLE

Witnesses:
GEORGE W. SELTZER,
CHARLES A. RUTTER.